US006196106B1

(12) United States Patent
Kurelek et al.

(10) Patent No.: US 6,196,106 B1
(45) Date of Patent: Mar. 6, 2001

(54) TREE FELLING DISC SAW WITH REPLACEABLE ARCUATE TEETH

(75) Inventors: John Kurelek; Duane Anthony Barlow, both of Brantford; Leonard Cobb Cole, Paris; Andrew Robert Hoshel, Brantford, all of (CA)

(73) Assignee: Tigercat Industries Inc., Paris (CA)

( * ) Notice: Subject to any disclaimer, the term of this patent is extended or adjusted under 35 U.S.C. 154(b) by 0 days.

(21) Appl. No.: 09/179,547

(22) Filed: Oct. 28, 1998

(51) Int. Cl.$^7$ ........................................................ B27B 33/08
(52) U.S. Cl. ........................ 83/841; 83/843; 83/698.41
(58) Field of Search ............................. 83/841, 840, 839, 83/845; 407/40, 34, 42, 46

(56) References Cited

U.S. PATENT DOCUMENTS

| | | | |
|---|---|---|---|
| 58,664 | * 10/1866 | Miller | 83/841 |
| 67,682 | 8/1867 | Strange | 83/839 |
| 80,929 | 8/1868 | Disston | 83/845 |
| 81,811 | 9/1868 | Miller | 83/839 |
| 107,593 | * 9/1870 | Brooke | 83/841 |

(List continued on next page.)

FOREIGN PATENT DOCUMENTS 63457   6/1989   (CA) .

OTHER PUBLICATIONS

Brochure 1—Simonds—"Inserted Tooth Saw Blade" (date unknown).
Brochure 2—Simonds—"Inserted Tooth Saw Blade" (date unknown).

*Primary Examiner*—Rinaldi I. Rada
*Assistant Examiner*—Kim Ngoc Tran
(74) *Attorney, Agent, or Firm*—R. Craig Armstrong

(57) ABSTRACT

The disc saw blade has a plurality of arcuate teeth detachably mounted in complementary-shaped arcuate sockets provided in a rim portion around the circumference thereof. Each tooth has a portion butting against a stop, such as a transverse tail stop surface defined by an inward projection of the socket. The configuration provides a small throw entry gap to reduce the likelihood of sticks being thrown. The teeth preferably are detachably mounted by virtue of a tight fit within the sockets, with no use of fasteners to absorb cutting forces. Keying elements such as a male portion of generally rectangular cross-section extending from the socket into a corresponding female portion in the tooth preferably are used to ensure proper alignment of each tooth relative to the plane of the disc saw blade. Preferably, the teeth and sockets are parts of concentric circles, the diameter of the teeth preferably being slightly larger than the diameter of the sockets, thereby producing a press fit. An axial pin may be installed in each tooth through a clearance space within the blade, such that the pin contacts the blade when its tooth rotates slightly away from its installed position, to prevent further rotation away from its installed position. An adapter preferably is used to assist in installation of the teeth, the adapter having a body which is rotatable by a driving tool and having pins or the like extending laterally therefrom to engage the tooth such that the tooth rotates with rotation of the adapter. Preferably, the adapter has an arcuate element secured along one side of its body to ride against a surface of the socket as the tooth is installed, thereby maintaining the tooth in proper engagement with the socket throughout its installation.

21 Claims, 15 Drawing Sheets

U.S. PATENT DOCUMENTS

| | | | |
|---|---|---|---|
| 108,059 | 10/1870 | Smith | 83/839 |
| 142,258 | 8/1873 | Miller | 83/845 |
| 151,043 | 5/1874 | Miller | 83/839 |
| 204,697 * | 6/1878 | Adams | 83/841 |
| 289,715 | 12/1883 | Risdon | 83/845 |
| 295,649 * | 3/1884 | Kellen | 83/840 |
| 302,375 * | 7/1884 | Bamford | 83/841 |
| 306,967 | 10/1884 | Simonds | 83/841 |
| 313,427 | 3/1885 | Johnson | 83/845 |
| D. 320,543 | 10/1991 | Gilbert | D8/70 |
| 326,685 * | 9/1885 | Simonds | 83/840 |
| 368,999 | 8/1887 | Emerson | 83/836 |
| 417,468 * | 12/1889 | Brooke | 83/841 |
| 488,336 * | 12/1892 | Kendall | 83/845 |
| 504,412 * | 9/1893 | Brooke | 83/841 |
| 1,574,609 * | 2/1926 | Currier | 83/840 |
| 3,071,027 | 1/1963 | Hiltebrand | 83/845 |
| 4,270,586 | 6/1981 | Hyde | 144/336 |
| 4,445,552 | 5/1984 | Hyde | 144/336 |
| 4,446,897 | 5/1984 | Kurelek | 144/336 |
| 4,491,163 | 1/1985 | Kurelek | 144/336 |
| 4,492,140 * | 1/1985 | Pano | 407/46 |
| 4,563,929 | 1/1986 | Ringlee | 83/840 |
| 4,750,396 | 6/1988 | Gaddis et al. | 83/844 |
| 4,765,217 | 8/1988 | Ludwig | 83/841 |
| 4,879,936 | 11/1989 | Anderson | 83/842 |
| 4,885,968 * | 12/1989 | Tuomaala | 83/839 |
| 4,932,447 | 6/1990 | Morin | 83/839 |
| 4,955,273 | 9/1990 | Pawlosky | 83/845 |
| 5,085,112 | 2/1992 | MacLennan | 83/840 |
| 5,092,212 | 3/1992 | Pawlosky | 83/845 |
| 5,211,212 | 5/1993 | Carlson | 144/241 |
| 5,261,306 | 11/1993 | Morey | 83/840 |
| 5,303,752 | 4/1994 | MacLennan | 83/840 |
| 5,377,731 | 1/1995 | Wildey | 144/241 |

* cited by examiner

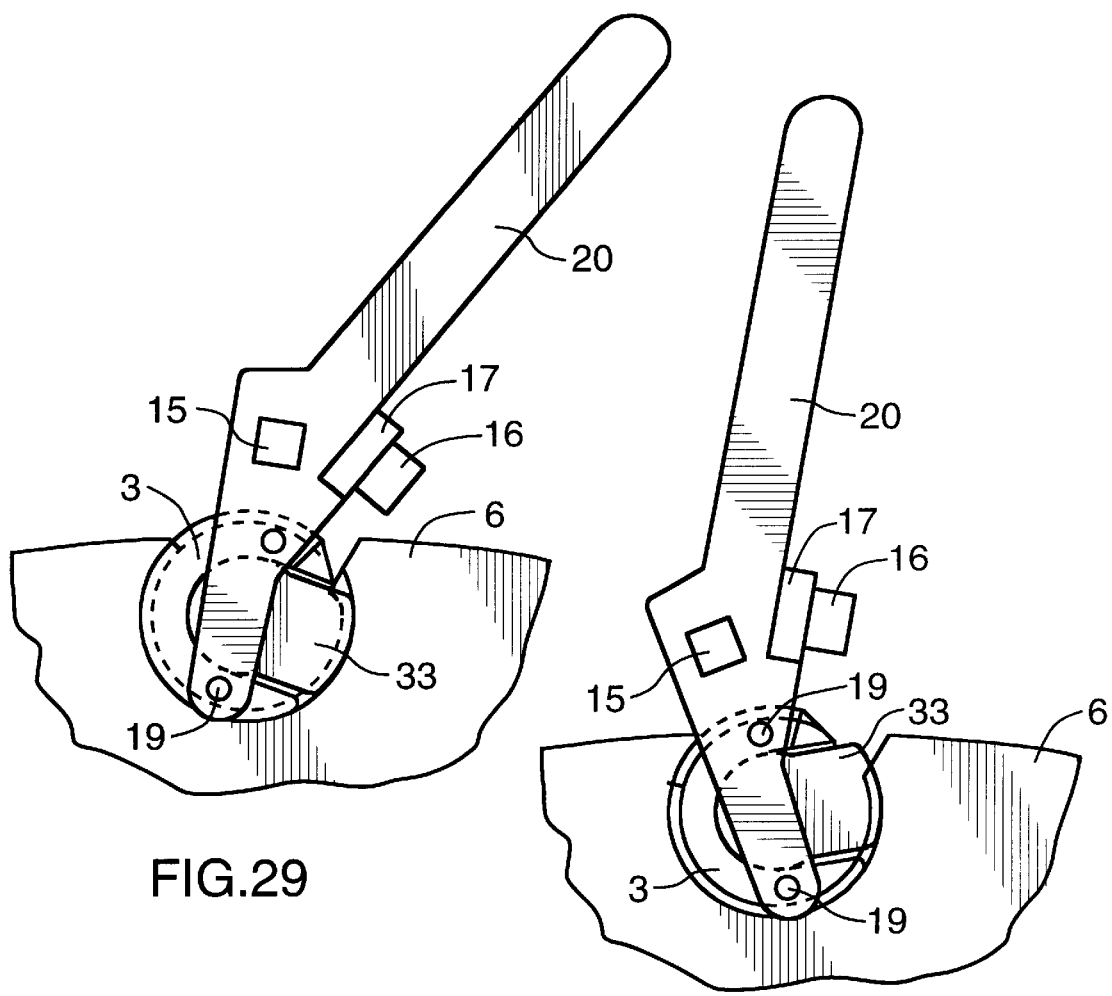
FIG.29
FIG.30
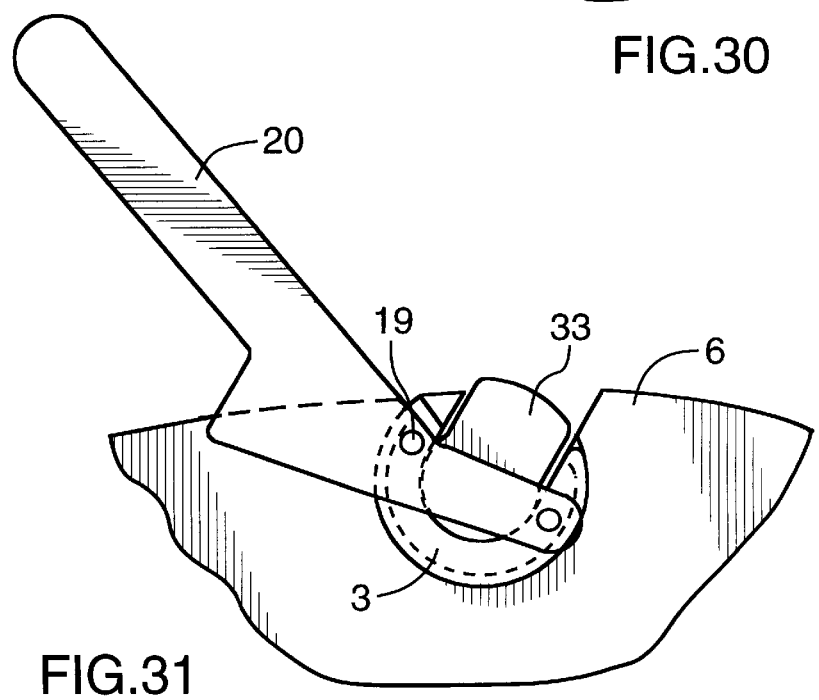
FIG.31

TREE FELLING DISC SAW WITH REPLACEABLE ARCUATE TEETH

BACKGROUND OF THE INVENTION

This invention relates to tree felling heads, particularly those of the type using circular saw blades for tree felling, and in particular to a head having a saw blade with replaceable teeth.

Tree felling disc saws such as first described in U.S. Pat. No. 4,445,552 (Hyde) and U.S. Pat. No. 4,491,163 (Kurelek) and later modified by, amongst others, U.S. Pat. No. 5,377,731 (Wildey) and U.S. Pat. No. 5,085,112 (MacLennan), are constructed to be unusually sturdy (e.g. 1 inch thick) and to cut an unusually wide kerf (e.g. 2-inches thick). The sturdiness is necessary to allow relatively poorly controlled machine travel or knuckle boom reach to be used to feed the saw through the tree. This requires a thick blade to resist bending from errant feed motion, and accordingly a wide kerf to give clearance for the blade in the cut. In addition, after the tree is cut, the designs are necessarily such that the butt of the still vertical tree does not rest on any top surface of the rotating saw, but on a fixed butt plate which is recessed into the saw, as illustrated for example in FIG. 5 (prior art). The saw's kerf must be wide enough to allow entrance of the combined thickness of this butt plate and the rotating blade and still have some clearance left over on the bottom for head drop, which occurs as a cut is completed and the weight of the tree is added to what the machinery is supporting.

It is because of these greater strength and wider kerf needs on tree felling applications that thin, commercially available circular crosscut saw blades such as those marketed by Simonds, with for example a ¼ inch blade and ⁷⁄₁₆ inch kerf, could not be applied to tree felling. Some early tree felling machines temporarily solved the disc strength and wide kerf needs by crudely fabricating saws with integral teeth, similar to some inexpensive cross cut saws, but from approximately one-inch thick steel plate and with alternate teeth bent up and down to cut a two-inch kerf (see for example U.S. Pat. No. 4,270,586 (Hyde et al.)).

It was thought that toughness on the job to protect against breakage from encounters with rocks was a most essential feature and that if the cutting points dulled they could be touched up with a grinder or even rebuilt by welding many times during the life of the relatively expensive steel disc. However, it soon became obvious that loggers tended not to take the time to rebuild and sharpen teeth and were running with such dull saws that power consumption was high, productivity was low and blade stresses so high that cracking at the gullets was occurring.

As it became apparent that loggers would pay more for a saw with replaceable, keener cutting teeth, various "bolt-on" ideas were devised and used. Some examples can be seen in U.S. Pat. No. 4,750,396 (Gaddis), U.S. Pat. No. 4,563,929 (Ringlee), U.S. Pat. No. 5,085,112 (MacLennan), U.S. Pat. No. 5,303,752 (MacLennan), U.S. Pat. No. 4,879,936 (Anderson), U.S. Pat. No. 5,211,212 (Carlson et al.), Des. 320,542 (Gilbert), U.S. Pat. No. 5,377,731 (Wildey) and U.S. Pat. No. 4,932,447 (Morin).

Although these devices sever trees from the stump well and some are relatively easy to maintain, they all have various drawbacks, including some which are safety-related. They all depend on threaded fasteners to retain their teeth and or tooth holders. Some have many parts (as many as 6 per tooth) which can potentially be thrown if those threaded fasteners wear out, unscrew or break.

Others with fewer parts, such as in U.S. Pat. No. 5,377,731 (Wildey) and U.S. Pat. No. 4,932,447 (Morin), have large gaps between teeth where the ends of sticks of wood can enter and be thrown. Manufacturing clearance requirements dictate the apparently excessive gap of these saws. U.S. Pat. No. 4,446,897 (Kurelek) showed a taper-held replaceable tooth in a continuous rim, but an optimal method of holding such teeth in place against cutting forces was never devised. U.S. Pat. No. 5,261,306 (Morey et al.), is exceptional in providing reduced throw probability by having a saw blade periphery advantageously contoured with bumps to at least effectively reduce the throw gap between teeth at the circumference, but tooth retention is very dependent on a threaded fastener.

The bolt and screw parts used on many tooth holding applications present many chances for error that can result in parts being dangerously thrown. For example, incorrect installation torque can result in loosening, or unseen fracture; the fasteners are vulnerable to poor quality choice or supply during servicing by the user; the screw head sockets can fill with tree gum and be difficult to remove, and hence delay timely maintenance; and the fasteners, holders and rim can be significantly weakened by wear (from wood chips and sand), which is not automatically corrected when teeth are replaced.

FIGS. 15 and 16 (prior art) illustrate the throw gap which results from several typical prior art shank and bolt tooth attachment methods. FIG. 15 shows the blade from above, and FIG. 16 shows the blade edge-on. It is known that a tangentially oriented wooden stick, somehow accidentally and rapidly fed at the saw rim of teeth, can be dangerously thrown if a radial face of a moving saw tooth can contact sufficient of the stick end grain area to instantly accelerate it to tooth tip velocity without cutting or fracturing out a relatively harmless chip of wood. The exact values of such numbers as saw rpm, tooth velocity, stick size, stick density and weight and the engagement area at which throwing rather than cutting occurs are virtually impossible to calculate and design against. However, it is reasonable to predict that for any given saw speed, the greater the gap between the face of a tooth and the back of the previous passing tooth, the more likely it is that a stick end will occasionally enter the gap sufficiently to be thrown. A stick might enter a gap from either the top or the bottom or the circumference of a saw toothed rim. It is also evident that near horizontal or tangential stick angles would most likely result in a spear-like throw if the saw does not break a chip out of the stick. A continuous smooth rim which would not be able to throw cannot be used because at least enough gap needs to be provided as a gullet to accept the wood chips being cut loose and to carry them out of the cut for expulsion.

There has thus been a need for a felling saw blade that would have a relatively smooth circumference with only enough tooth protrusion to do its share of cutting and enough gullet gap to carry its wood chips out of the kerf in the tree. In such a blade, the tooth retention method should not depend on threaded fasteners, and wear in excess of normal such as might occur on poorly maintained machines should not result in tooth parts or tooth holders being thrown, but rather the saw should cease to cut at a sufficiently productive rate, so that new teeth will have to be installed.

For the work of cross-cutting already-felled trees into logs, the saw mill industry has long known the art of using arcuate (C-shaped) replaceable teeth in circular sockets. In U.S. Pat. No. 67,682 (Strange), U.S. Pat. No. 80,929 (Disston), U.S. Pat. No. 81,811 (Miller), U.S. Pat. No. 108,059 (Smith), U.S. Pat. No. 142,258 (Miller), and U.S.

Pat. No. 488,336 (Kendall), we see very early examples of single piece arcuate shaped teeth that are rotated into their sockets and held there by developing some press fit. In U.S. Pat. No. 289,715 (Risdon), U.S. Pat. No. 313,427 (Johnson), and U.S. Pat. No. 368,999 (Emerson), we see examples where an additional non-threaded fastener is used to retain the one-piece tooth against rotation in the removal direction, but not to stop rotation caused by the impact of cutting (which always rotates the tooth further into its socket). This very old art showed that rotation of the tooth in its socket from cutting forces could be stopped by providing stops in the socket to contact the tooth either at its tail or at the back of its head or both. More recent related U.S. Pat. No. 4,955,273 and U.S. Pat. No. 5,092,212 (both Pawlosky) are to the same effect.

It was thought by logging saw designers that this existing saw technology for freely cross-cutting already felled trees and logs would not stand up to the abusive job of cutting trees and brush in the woods. The saw blade with its axis vertical would have to be strong enough to, at certain times of use, support a tree bearing down on it near its circumference. At other times the weight of the felling head and part of the supporting boom would push the blade down on a stump. A much thicker blade would therefore be needed. The thickness would depend on the saw head design and the working conditions, but generally whereas cross-cut teeth are a maximum of 0.18 inches thick, various tree felling, stump clearing and brush cutting work would require tooth thicknesses mainly in the range of 1" to 2½ thick, although other thicknesses are possible.

Merely scaling up the prior art crosscut blades and their teeth, however, is not usable in practice. There are some problems associated with attempting to do so, which the present invention overcomes.

One such problem is that the arcuate teeth of prior art cross-cut saws are designed to be installed at the required snap-in or holding press fit by a single person with a reasonable manual effort. Obviously, it would be equally desirable for the teeth of felling type saws to be installable by a single person with only reasonable manual effort. However, if with no other modifications the width of prior art teeth was increased to cut the kerf width that would be needed for tree felling, the insertion torque required would increase exponentially to unmanageable values.

Another problem is that all of the above prior art arcuate tooth inventions show that the teeth are held in their sockets against axial or twisting-out movement by a relatively steep-angled V-groove at their circumference, which engages over a V-pointed ridge which takes up the entire bore of the socket. With some modifications to arc shaping and a switch to a two piece tooth design, arcuate teeth in circular sockets are to this day held against axial movement by such steep angle V grooves. Tooth rotation torque is dependent on the forces normal to the V surfaces.

If a felling saw tooth was to be 1.8 inches thick instead of 0.18 as in a typical cross-cut saw, a simple calculation warns that the radial force to collapse the C-shape of the tooth into its socket would be ten times as great as for the cross-cut saw tooth, and that if the same V-angle was maintained, the normal forces and hence rotational torque would also be so increased, making manual tooth replacement virtually impossible.

SUMMARY OF THE INVENTION

It is thus an object of the invention to provide an improved tree felling head, using a saw with a saw blade with teeth which are readily replaceable but securely installed.

In particular, it is an object of the invention to modify the cross-cut type of circular socket and tooth insertion and retention methods, so that it becomes usable for thick disc saws, with reduced risk of tooth parts and wood pieces being thrown during tree and brush cutting.

It is a further object, of the preferred embodiment, to avoid the use of threaded fasteners or the like to secure the teeth.

It is a further object, of the preferred embodiment, for the teeth to constitute the only significant early wear elements, so that replacement of the teeth restores the blade to nearly-new condition, for a longer safe service life than in the prior art.

The invention uses replaceable teeth which are arcuate, i.e. generally C-shaped, combined with novel insertion and retention means. As discussed above, arcuate teeth are known in the prior art of cross-cutting saws, but were thought to be unsuitable for tree felling, or at least were never adapted to tree felling. In the invention, it was realized that with suitable modifications and adaptations, the circular socket type of cross-cut tooth insertion and retention could be used to great advantage for tree felling disc saws, and that among other advantages, this would reduce the risk of tooth parts and wood pieces being thrown during tree felling operations in the forest.

The invention provides a robust circular saw blade for cutting a wide kerf as is necessary in high-speed tree felling, by providing a disc with arcuate sockets in its rim, to accommodate arcuate teeth which project only a minimal distance from the circumference of the disc. This reduces the probability of sticks or chunks of wood being thrown during tree felling and brush cutting operations. The teeth are of a width sufficient to cut a kerf of sufficient width to accommodate the rim with only a small clearance as the blade advances. The teeth are rotated into the sockets and held in place by a combination of dimensional entrapment and a press fit, so as to avoid dependence on threaded fasteners or the like.

Further features of the invention will be described or will become apparent in the course of the following detailed description.

BRIEF DESCRIPTION OF THE DRAWINGS

The invention will now be described in detail with reference to the accompanying drawings of the preferred embodiment by way of example. In these drawings:

FIGS. 29–31 show, in sequence, the installation of a tooth using the wrench of FIGS. 27–28.

DETAILED DESCRIPTION OF THE PREFERRED EMBODIMENT

Figure 1:
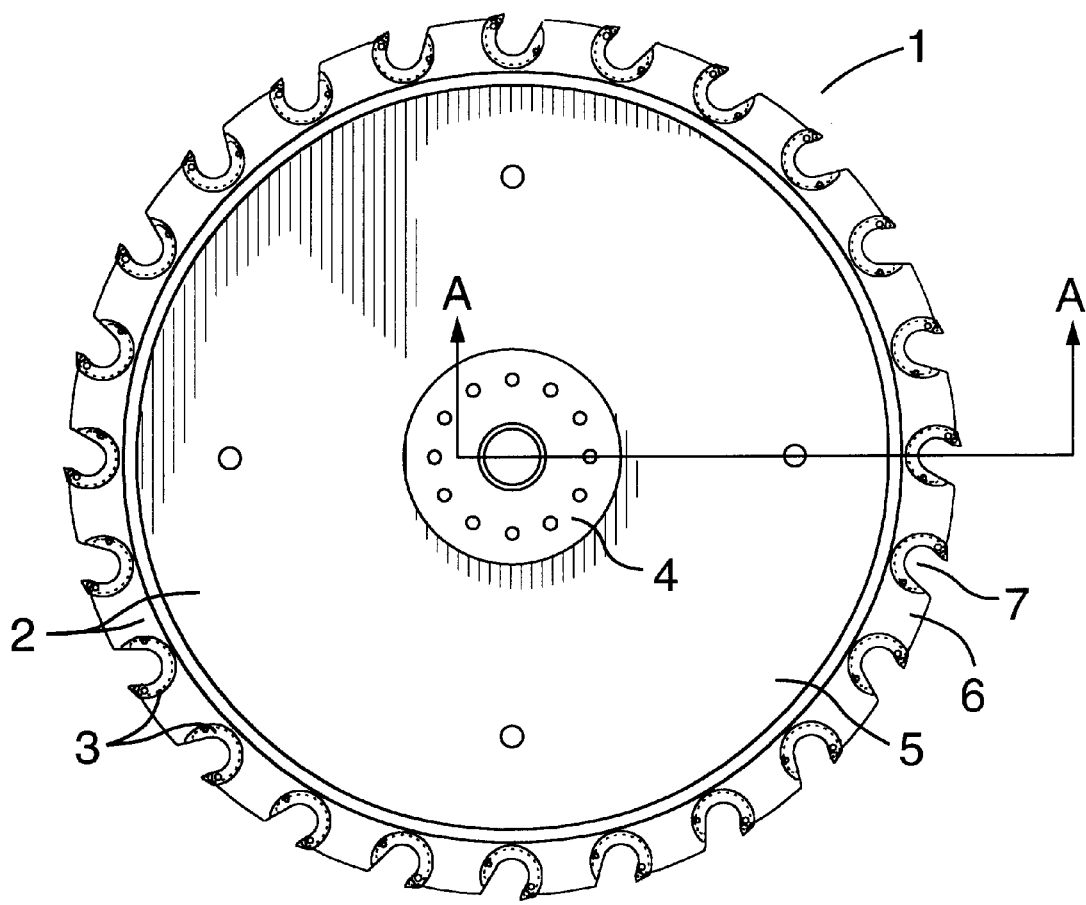
FIG. 1 is a plan view of the preferred embodiment of the blade in the invention.
Figure 2:
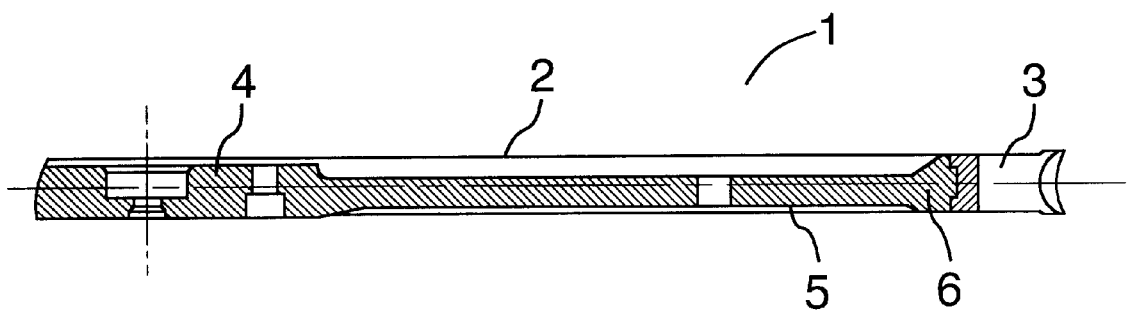
FIG. 2 is a side cross-sectional view of the blade, at A—A of FIG. 1.

The saw blade 1 comprises a disk 2 and multiple removable teeth 3. The disc has an integral hub 4, web 5, and rim 6. The teeth are arcuate, i.e. generally C-shaped, with an open gullet 7, and are installed in correspondingly-shaped sockets 8 in the rim 6. In the preferred embodiment, the rim 6 is substantially thicker than the web 5, at least in the area of the teeth. The hub 4 is a mounting means for bolting the blade to the drive means (not shown, but similar for example to that shown in FIG. 5 (prior art)).

Because of the robust equipment needs for tree felling, the rim 6 at least in the region of the teeth is preferably at least about 1¼ thick and preferably closer to 2 inches thick, i.e. approximately in the range of 30–50 mm. The teeth accordingly are sized to cut a kerf which is even thicker, e.g. about 2⅛ or 2¼ inches for a 1⅞ inch rim. This distinguishes this type of saw from the much flimsier type of crosscut saw mentioned above, where the thickness of the blade around the teeth typically may be only ³⁄₁₆ to ¼ inches.

In the flimsiest version of the invention for harvesting small trees, the rim at least in the area around the teeth would still typically be at least ¾ inch thick and the kerf would typically be at least 1¼ inches thick to allow room for a butt plate in cases where a butt plate is used, or typically at least 1 inch thick with no butt plate.

Most applications of the invention will require tree gathering and hence a butt plate will be used, but for some applications such as clearing brush or cutting stumps, i.e. applications other than tree harvesting, there is no need for tree gathering. Such applications may not have a butt plate, so narrower kerfs and thinner teeth than customary for tree felling may be used. In other applications, smaller and larger diameter saws will require an even greater range of tooth thicknesses. For example, a very large diameter saw might be used for clearing stumps from previously-logged sites. Such a saw might have a 120-inch diameter, and although no butt plate would be required to support the weight of a tree, the disc thickness and kerf could be say 2 and 3 inches respectively. At the other extreme, for limb and brush clearing, again with no butt plate required, the saw may be only 20 inches in diameter, with a ½ inch blade and rim and a ¾ inch kerf. In such saws, the rim is not necessarily thicker than the web or main body of the blade, i.e. there may be no distinction between the "rim" and the web, in which case "rim" simply means an outer portion of the blade adjacent the circumference. For greater clarity, the expression "rim portion" is used in the claims, to indicate the area adjacent the circumference, regardless of whether or not there is in fact a discrete "rim".

Figure 5:
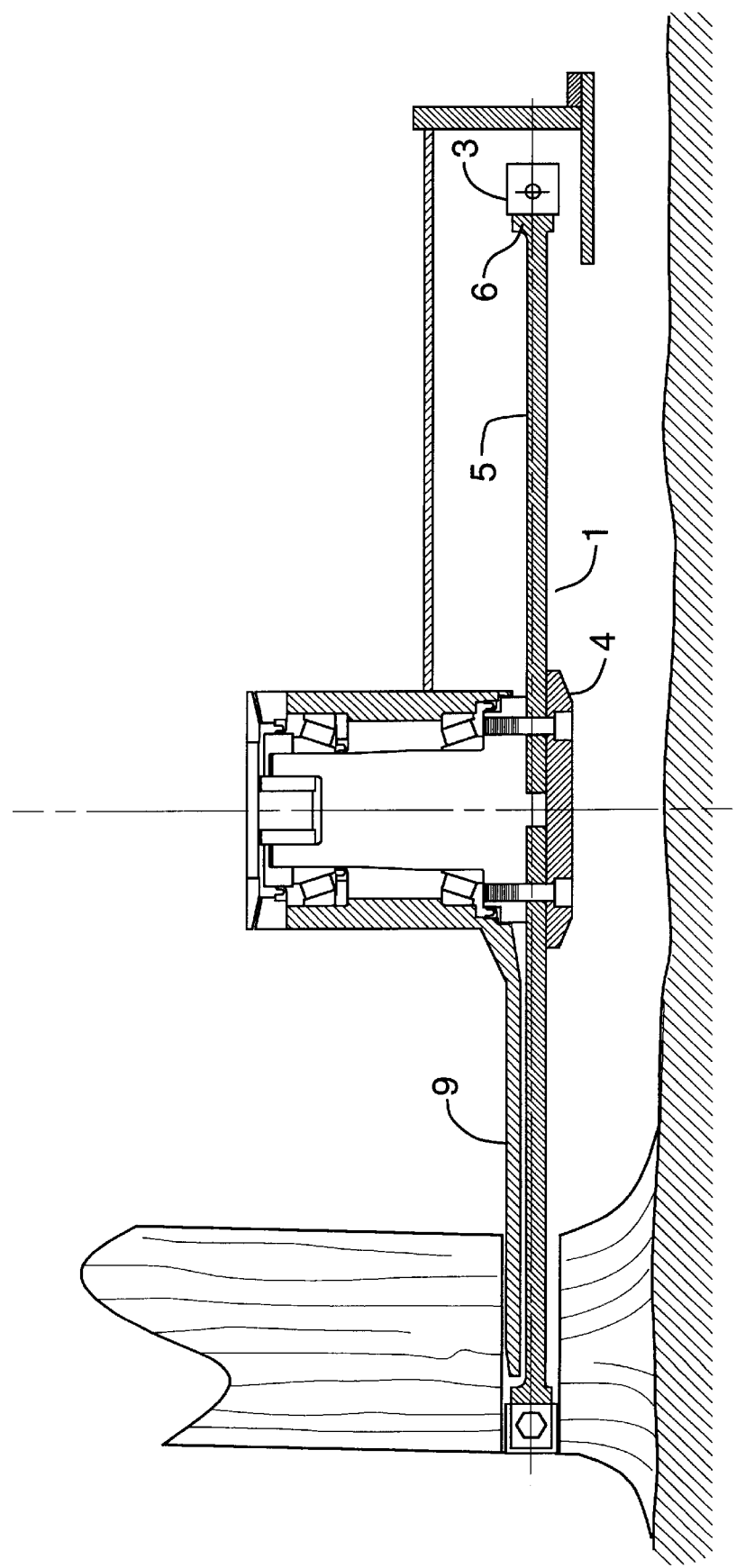
FIG. 5 (prior art) is a schematic side view showing a saw cutting a tree.

Returning to the preferred embodiment, however, the web 5 is made thinner both for weight reduction and in order to accommodate a butt plate 9, as known in the prior art and as shown in FIG. 5 (prior art). Preferably but not necessarily, this is accomplished by machining the disc to reduce the height of its upper surface inward from the rim, sufficiently to allow room for the relatively thick butt plate. This is as shown in FIG. 5 or in FIGS. 6A–6D.

Figure 3:
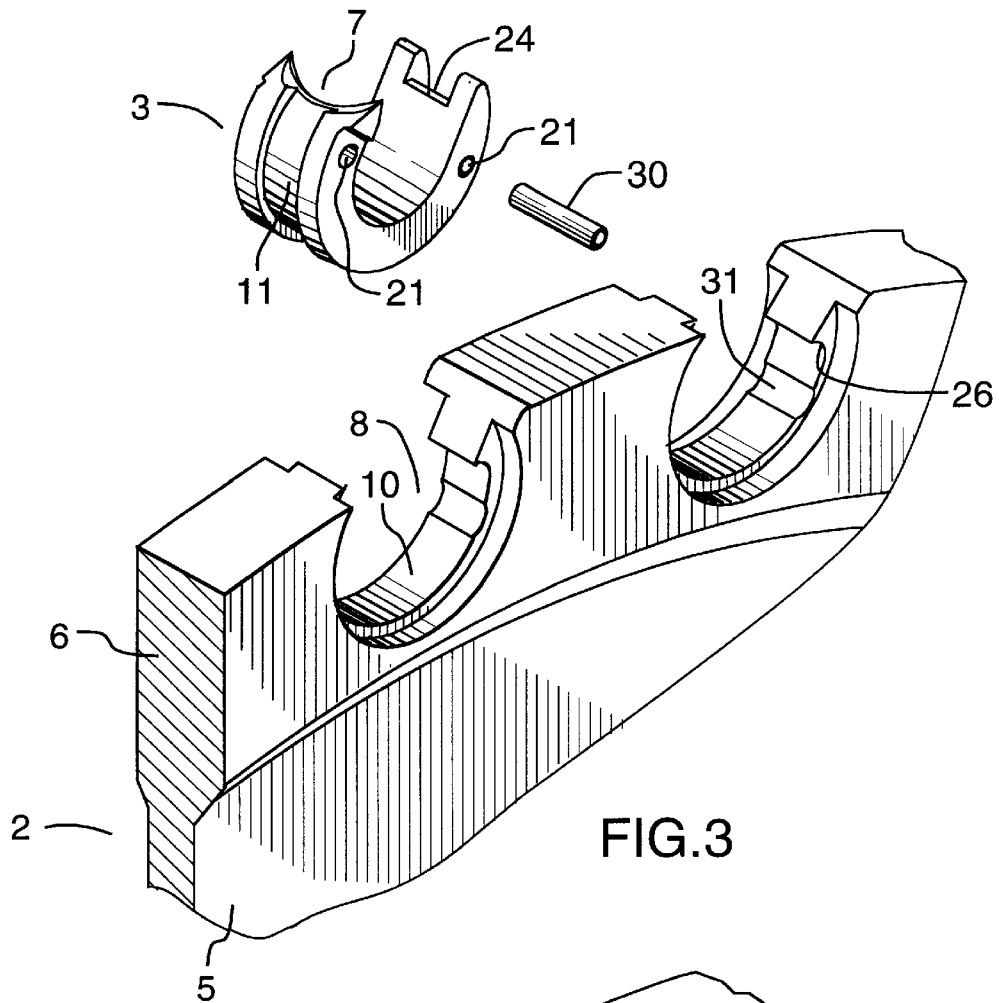
FIG. 3 is an exploded perspective showing one of the teeth, the corresponding socket in the rim of the blade, and a pin to prevent out-rotation.
Figure 4:
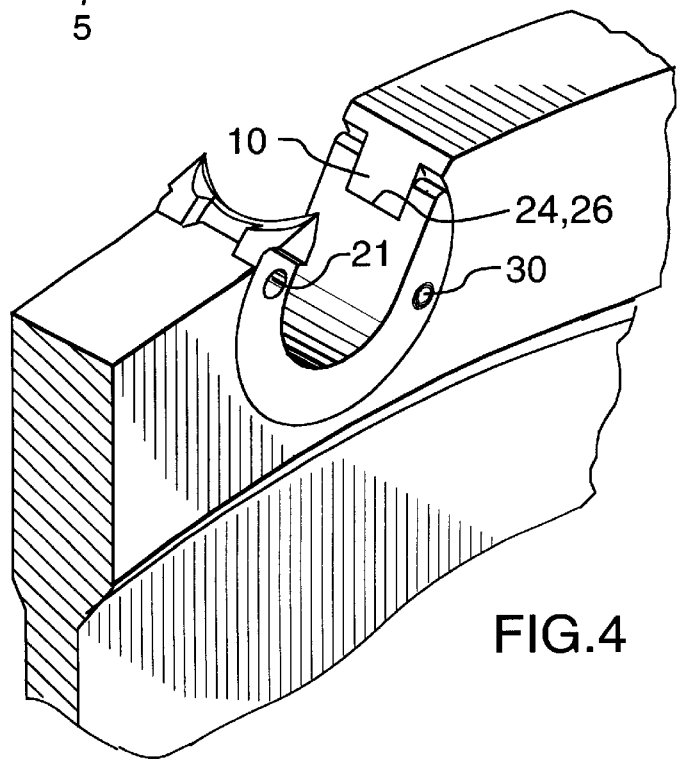
FIG. 4 is a perspective view corresponding to FIG. 6, showing the tooth installed in the rim.
Figure 6A:
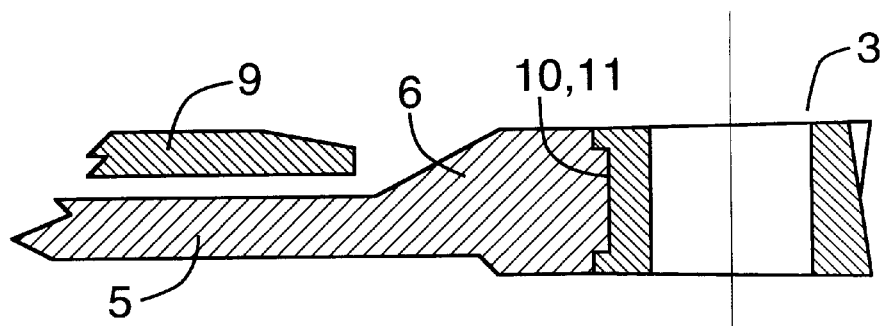
FIGS. 6A–6D are illustrations of alternative key means between the tooth and its socket in the rim.
Figure 6B:
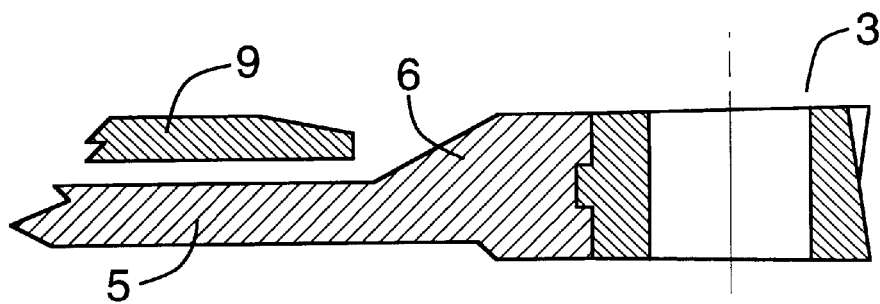
Figure 6C:
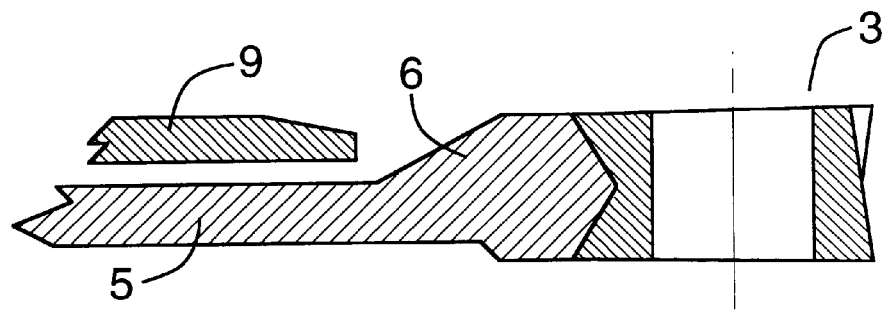
Figure 6D:
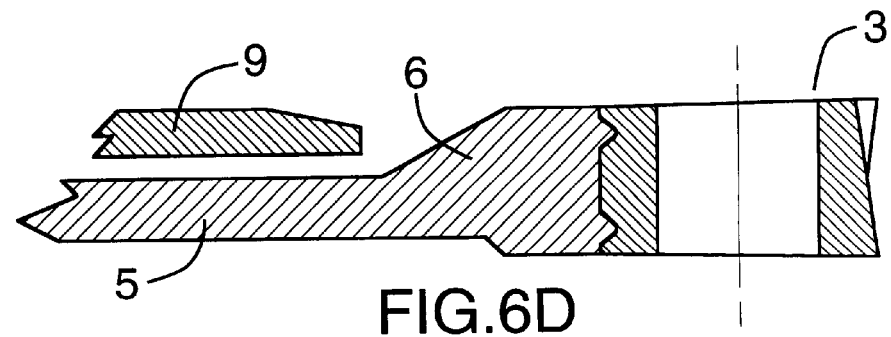

In the preferred embodiment, as shown best in FIGS. 3, 4 and 6A, each socket 8 has a square male key portion 10 preferably but not necessarily centered on the plane of the rim, and each tooth 3 has a corresponding female recess 11 to receive the male portion, to ensure and maintain the proper alignment of the tooth relative to the plane of the disc. As illustrated in FIGS. 6B–6D, alternative keying means clearly could be employed. For example, the sockets could have female portions with the teeth having the male portions (FIG. 6B), although this would rule out the preferred type of retainer pin 30. Alternatively, one could use a shallow V-shaped key (FIG. 6C), although this would not be as stable for thick teeth and would certainly not be preferred, for the reasons stated above in the Background of the Invention. As yet another alternative, multiple grooves could be used (FIG. 6D), although that would be somewhat complicated. It should be clear that the scope of the invention encompasses any and all suitable keying means, not just the preceding. The essence of the invention does not reside in the keying means.

Using the preferred keying means avoids the above-mentioned difficulties which would make manual tooth replacement virtually impossible with a V-shape. The preferred keying means provides easier size control, a smaller outer diameter and a parallel bore, achieving manageable insertion rotation torques.

Existing felling saw art uses different shaped cutting tips to suit various tree and ground conditions. Similarly, the teeth in this invention may be variously tipped as desired. FIGS. 6A–6D, for example, shows just one of many possible angled surface variations, by contrast to the preferred curved configuration of FIG. 3. It should be understood that for the purposes of this description a tooth that has a relatively small and light carbide tip brazed into a seat is still considered a one-piece tooth. Even though this does add another piece that can be thrown if not carefully attached, the requirement for such carbide tips depends on the soil conditions of the logging site and not on the type of saw being used.

Figure 7:
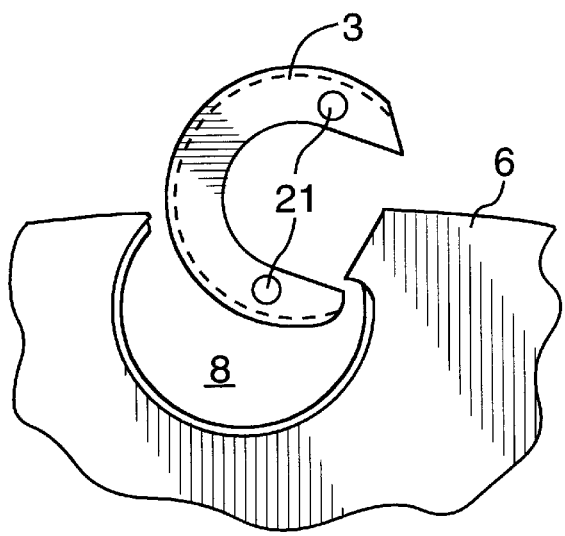
FIGS. 7–11 are consecutive views showing the sequence of installation of a tooth.
Figure 8:
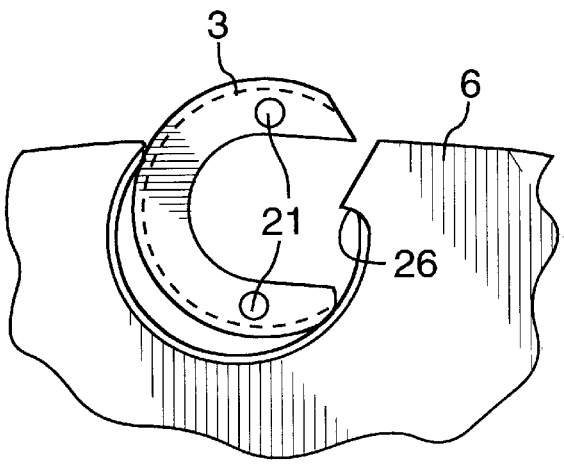
Figure 9:
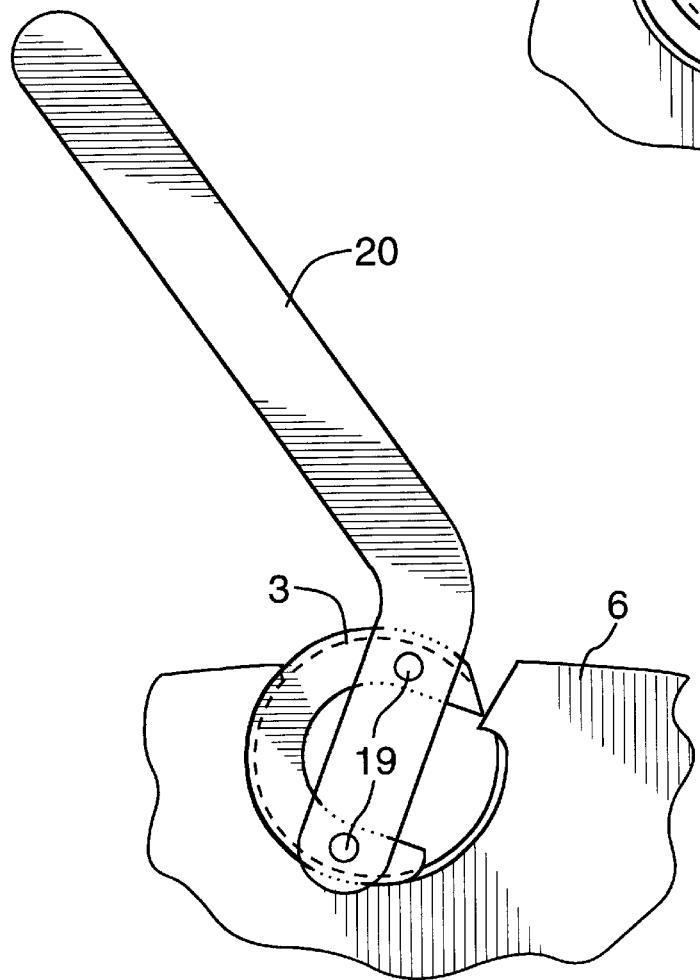

FIGS. 7–11 show the sequence and the principle of installation of a tooth in its socket. Essentially, the tooth is rotated into place. FIG. 7 shows the tooth 3 being hooked into the socket 8. FIG. 8 shows it being rotated freely about its tail into its socket. It rotates freely until reaching the position of FIG. 9. FIG. 9 shows a special wrench 20 having protruding pins 19 which are applied to the holes 21 (one of which holes is also used for the pin 30 described later) to produce about 40° of initial rotation from the FIG. 9 position to the FIG. 10 position, during which the arcuate outside diameter is being pressed in to match the inside diameter of the socket.

Preferably, the teeth and their sockets are concentric circles, with the inside diameter of the socket being slightly smaller than the outside diameter of the tooth. The slightly smaller diameter ensures a press fit during an additional approximately 40° of tooth rotation, from the position of FIG. 10 to the position of FIG. 11, developing a dimensional entrapment for the tooth. This last 40° requires considerable continuous torque, say 300 ft lb.

Obviously, the specific angles of rotation in the preceding are not critical to the invention. What is important is that the teeth fit tightly against rotation, e.g. by use of a slightly smaller diameter socket, and that a final additional angle of rotation after 180 degrees of socket contact is sufficient to create a dimensional entrapment for the tooth in the socket.

After the last 40 degrees or so of rotation, in the preferred embodiment a tail portion 24 of the female recess 11 of the tooth butts against a complementary-shaped tail stop 26 machined into the rim so as to project inwardly within the socket, to provide a transverse stop surface. This completely prevents any further rotation of the tooth in its socket from cutting forces, i.e. forces at the tooth tip resulting from whatever the tooth is contacting.

Alternatively, it may be possible to make both the socket and the tooth slightly elliptical, such that the major axes of the ellipses coincide when the tooth is fully rotated into its installed position, for a possibly somewhat relaxed fit, and such that there is a very tight press fit otherwise, i.e. when the tooth is rotated away from the fully installed position.

Figure 23:
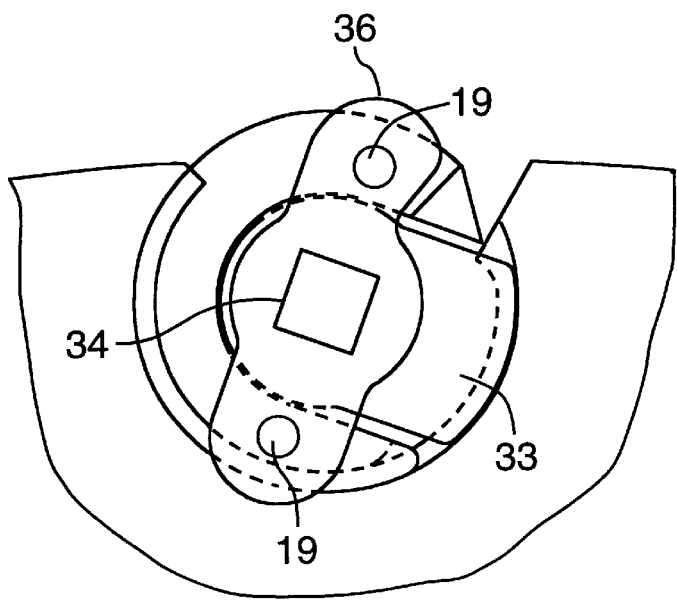
FIG. 23 is a front view of an adapter for use with a wrench for installation of a tooth.
Figure 24:
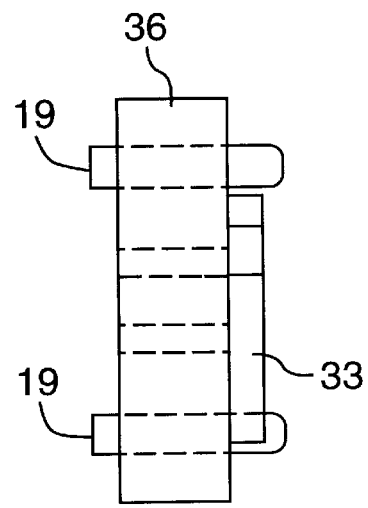
FIG. 24 is a side view of the adapter.
Figure 25:
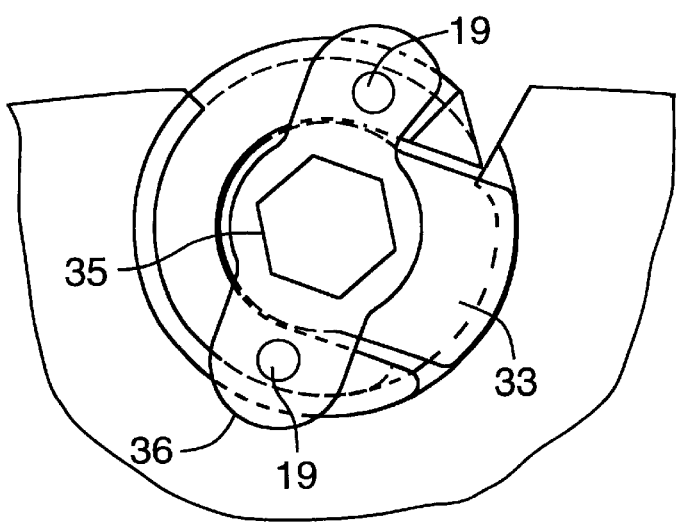
FIG. 25 is a front view of an alternative adapter, having a hex drive instead of a square drive as in the FIG. 23 adapter.
Figure 26:
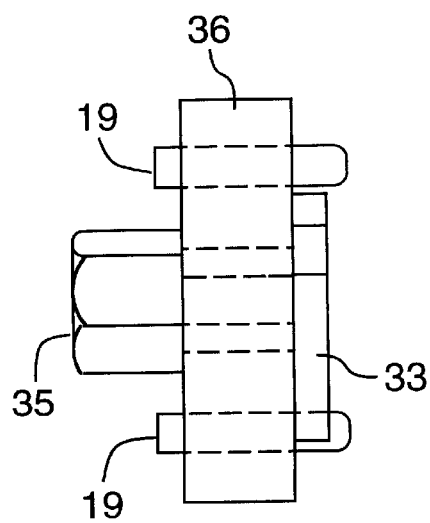
FIG. 26 is a side view of the FIG. 25 adapter.

While FIGS. 7–11 explain the theory of tooth insertion and removal in a simplified manner, it is found in practice that during insertion, at the position shown in FIG. 9 or slightly later, as the tooth begins to be squeezed by virtue of the slightly smaller socket diameter, the resultant of forces on the tooth may choose to rotate its tail end out of contact with the socket and abort the installation, even when the bent handle in the FIG. 10 position is used. Although a solution to this is to have an assistant tap the wrench and tooth radially in with a plastic maul as it is being rotated, this cannot be accepted as practical for the industry. Preferably, therefore, an adapter as illustrated in FIGS. 23–24 or FIGS. 25–26 is used instead. The adapter has a square drive socket 34 as shown in FIGS. 23–24, or a hex drive peg 35 for a hex wrench, as shown in FIGS. 25–26, so that it can be readily driven manually or with power tools. It has dowel pins 19 pressed into its body 36, protruding therefrom to engage the holes 21. The tooth is kept centered as it rotates, by virtue of a tongue 33 which is integral with the adapter and which rides in the arcuate socket as the tooth rotates, as can be seen from FIGS. 23 and 25 (or better still from FIGS. 29–31 referred to below). The tongue 33 is a circle segment 33 which in effect sufficiently completes an arc of a circle to ensure at least 180 degrees of contact with the socket. Otherwise, ignoring friction which tends to keep it in place, the tooth could pop out during the rotation leading up to the final 40 degrees or so of rotation. After the final 40 degrees of rotation, a total of about 220 degrees of contact is obtained, so that the tooth can only be removed by out-rotation.

Figure 27:
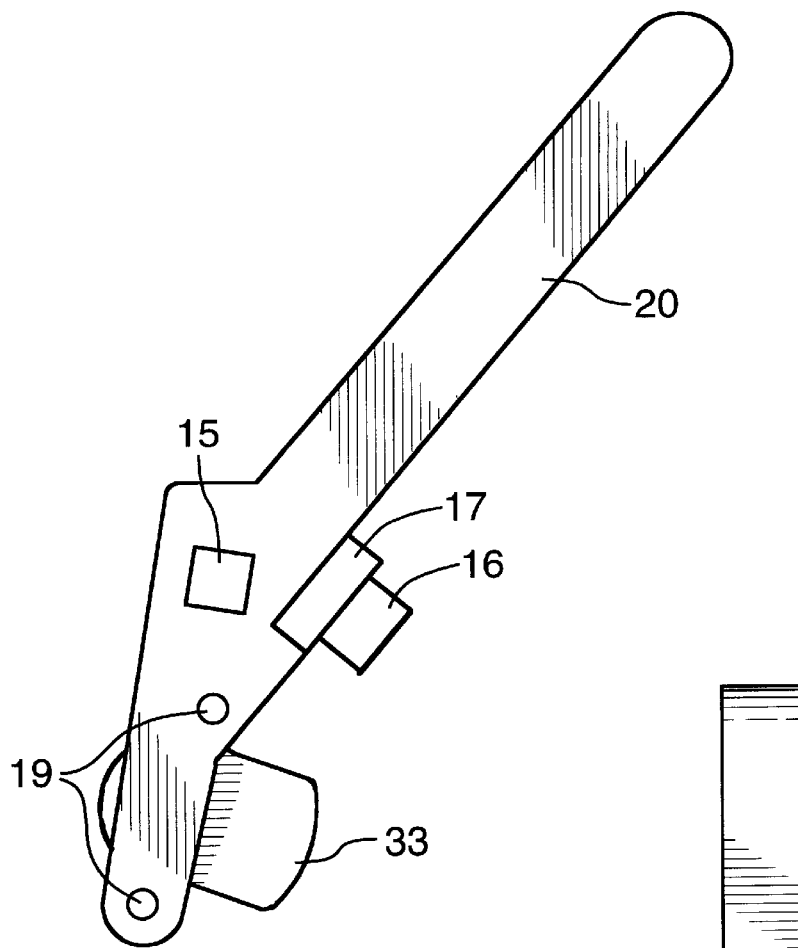
FIG. 27 is a front view of a special wrench for installation of a tooth, integrating the features of the adapter of FIG. 23.
Figure 28:
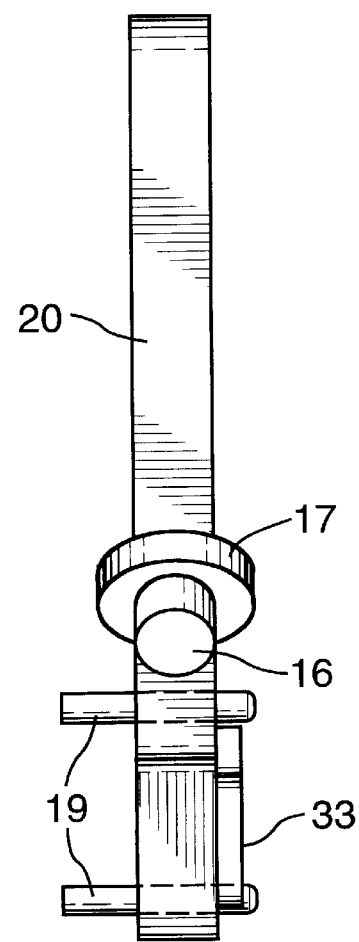
FIG. 28 is a side view of the special wrench of FIG. 27.

As shown in FIGS. 27–28, the tongue 33 could be made integral with a wrench 20 such as the one described earlier above, although providing this functionality via an adapter such as the ones of FIGS. 23–26 is simpler. In such a wrench, there may be provided a square drive socket hole 15, a rubber bumper 16 which can double as a rubber hammer, and a support 17 for the rubber bumper. FIGS. 29–31 show, in sequence, the installation of a tooth using the wrench.

Figure 10:
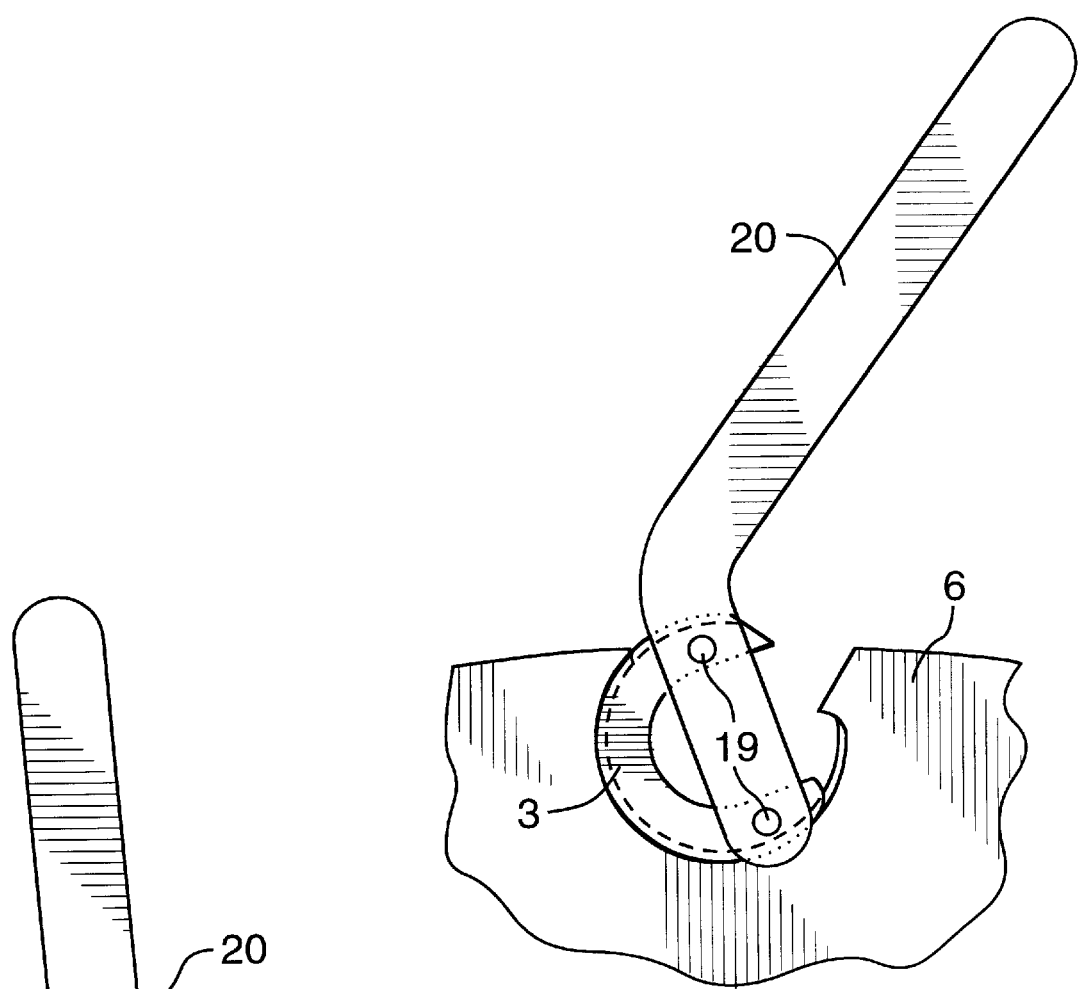
Figure 11:
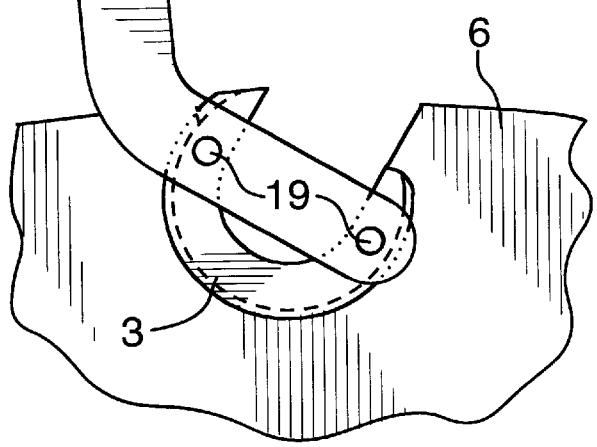

Although FIGS. 9–11 show a handle on the wrench so that tooth changes could be made remote from power tools, it is expected that air wrenches will often be used, with drive adapters such as shown in FIGS. 23–26.

In other tree felling saws such as Morin, Wildey, MacLennan and Gilbert, the teeth are attached in such ways that the force of cutting at the tooth tips has a tendency to tip or rotate the cutting part of the tooth in such a direction that bending stress concentrations can occur at a reduced section shank or at a fastener. In the invention, by contrast, the cutting forces on the tooth tend mainly to further rotate the tooth into its socket in compression against the tail stop 26, avoiding all section change stress concentrations.

As an alternative to such a tail stop 26, clearly other stop means could be used to prevent further rotation. For example, though not illustrated, a transverse pin or a transverse or radial or tangential bolt could be used to provide the stop surface. However, this is considerably less desirable than the preferred embodiment, since it creates dependency on the pin or bolt to withstand the forces transmitted from tooth collisions with wood or other material, with the attendant maintenance and safety concerns referred to earlier above. The inventor would not recommend or choose such alternative embodiments, but it should be clearly understood that they are intended to be included within the scope of the invention, should someone choose to adopt such an inferior stop means as a way of attempting to circumvent the patent.

Figure 12:
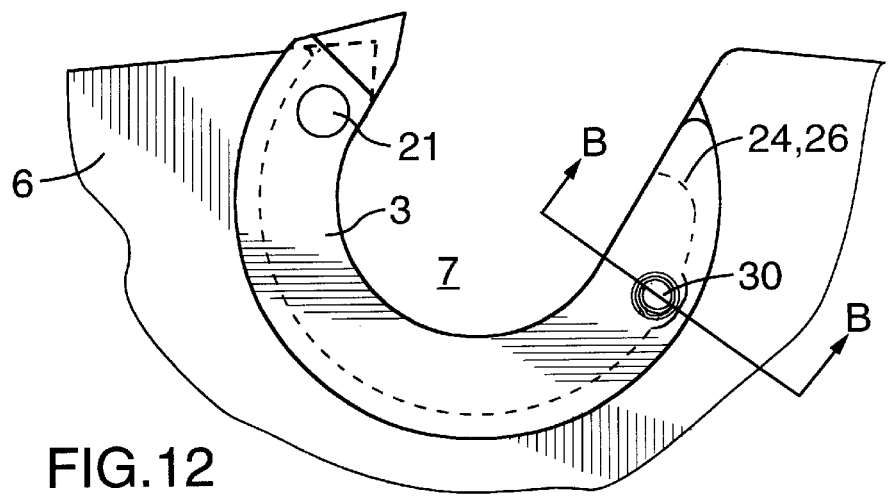
FIG. 12 is a plan view showing one of the teeth in its socket.
Figure 13:
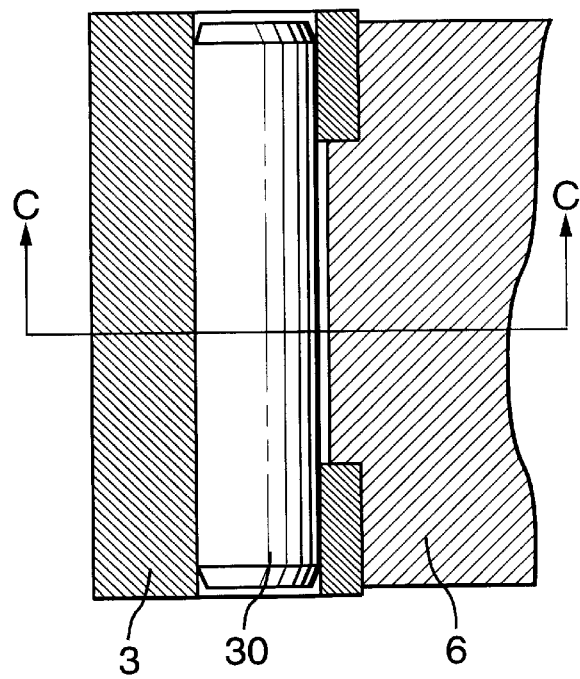
FIG. 13 is a cross-section at B—B of FIG. 12, showing a pin which prevents out-rotation of the tooth.
Figure 14:
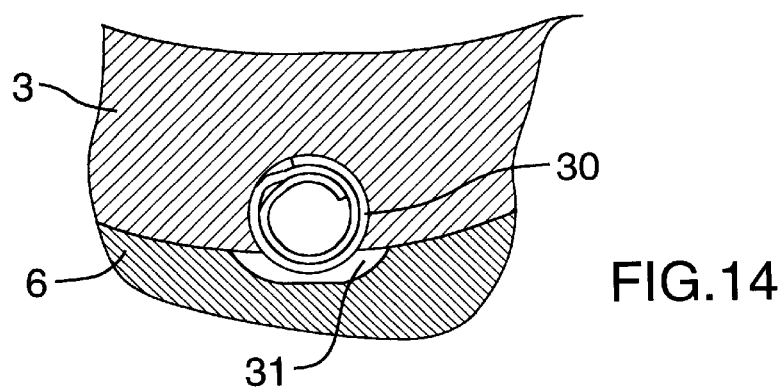
FIG. 14 is a cross-section at C—C of FIG. 13, showing the pin in more detail.

The press fit of the tooth in its socket in itself is sufficient to prevent any possible unintentional out-rotation of the teeth once installed, especially since cutting forces are in the opposite direction. However, as an added precaution against improper (reverse rotation) operation, for discouragement of tooth theft in the field, and for greater psychological reassurance in some sensitive operating locations, a pin may be provided, such as a roll pin 30 as shown in FIGS. 12–14. The arrangement is dimensioned in such a way that the pin is pressed only into its hole in the tooth and thus remains tight in the tooth. When a tooth is fully installed, there is a clearance space 31 for the pin in the blade, so that it does not received any of the forces from cutting. Nor does the pin hold the tooth with its tail portion 24 tightly against stopping means as in the prior art such as the above-mentioned MacLennan, Wildey, Morin and Gilbert patents. The pin comes into play only if out-rotation begins, i.e. it must be removed if out-rotation is desired for replacement of a tooth. The pin would however prevent accidental out-rotation of teeth should the hydraulics of the machinery be inadvertently connected to turn the motor in the "wrong" direction, and should tree cutting then be attempted. It is known that a capscrew or a bolt might also be used in this same location if head and nut space are provided, but this is not recommended, since that would introduce a threaded fastener with its inherent drawbacks. The fact that the pin is installed in the tooth and not in the blade means that repeated installation and removal of the pin does not cause any accumulated wear on the blade, such as might cause a loose pin over time. If rivets were used, as on some old crosscut saws, special machinery would be required to install and remove them, given the relatively large size that would be needed. Clearly, this would be bad for in-field maintenance.

Figure 15:
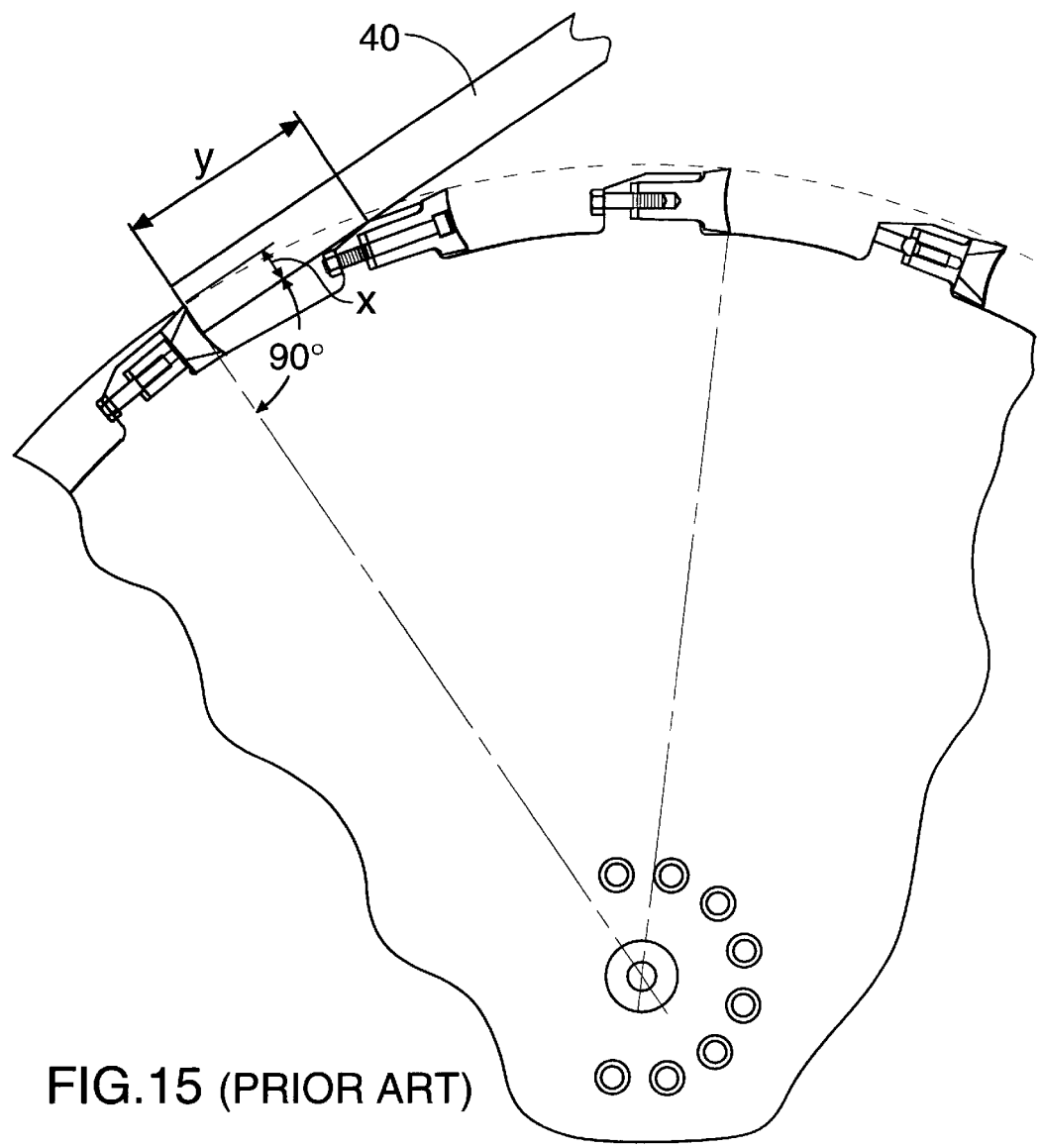
FIG. 15 (prior art) is a plan view showing a typical "throw gap" in the prior art.
Figure 16:
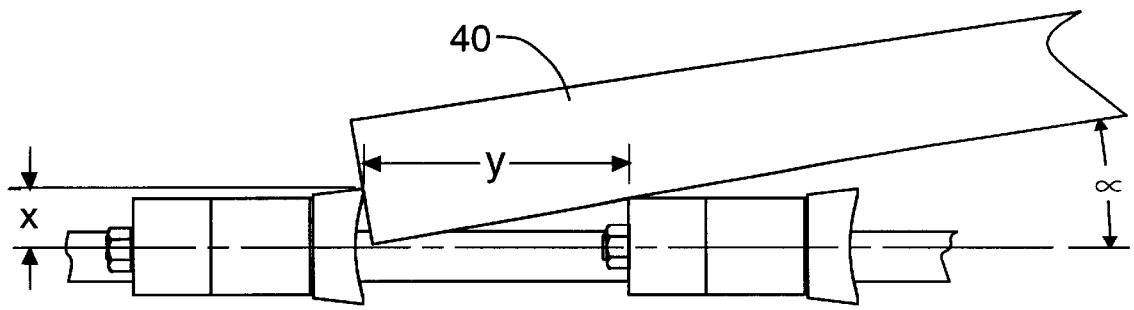
FIG. 16 (prior art) is a side view showing the throw gap.
Figure 17:
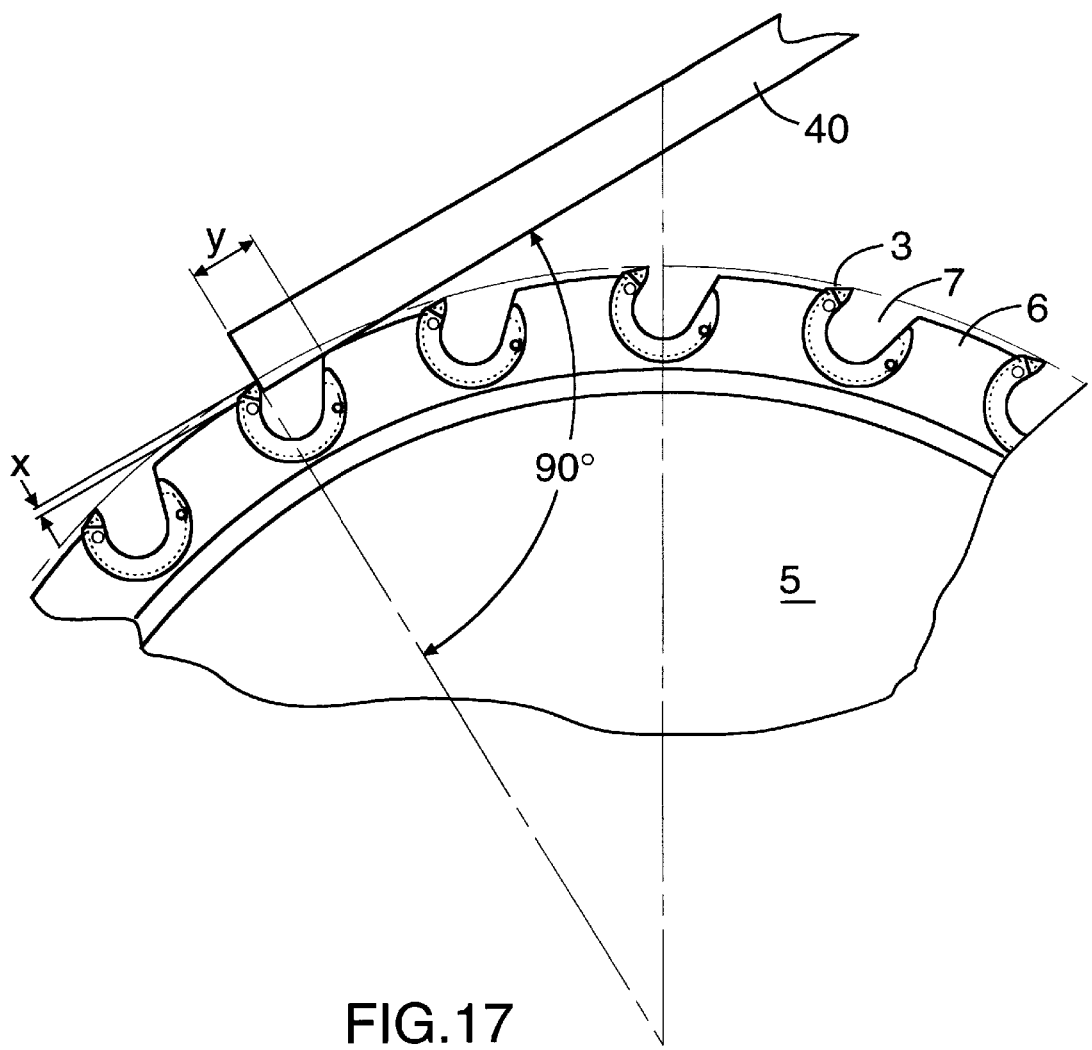
FIG. 17 is a plan view showing the reduced throw gap in the present invention.
Figure 18:
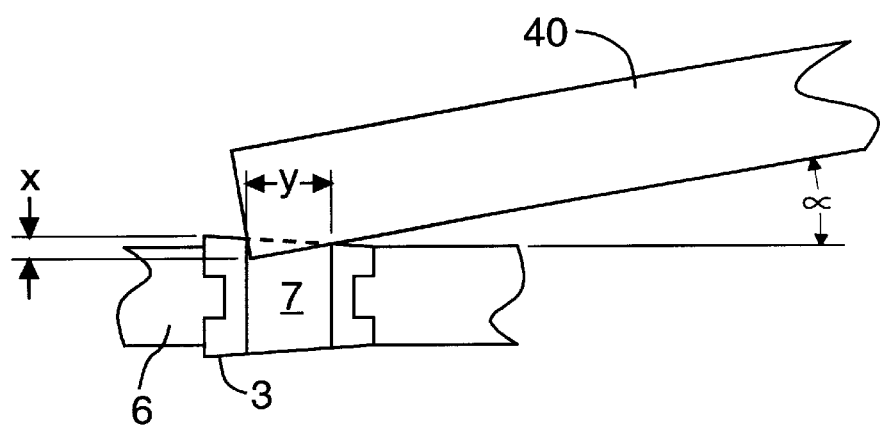
FIG. 18 is a side view showing the reduced throw gap in the present invention.

A particular advantage of the invention is that it provides a highly effective solution to the previously described problem of sticks potentially being thrown. As can be seen from FIGS. 17 and 18, a very short throw entry gap can be achieved, and with it an end grain engagement chance that is very substantially less than the engagement chance in felling saw prior art. Comparing FIG. 15 (prior art) with FIG. 17, and comparing FIG. 16 (prior art) with FIG. 18, shows greatly reduced throw entry gaps in both planes, e.g. from an inch or more of engagement x (FIG. 15) to possibly less than half an inch engagement (FIG. 17) with a stick 40 oriented more or less tangentially, in the plane of the saw or at a small angle a thereto (FIGS. 16 and 18). In the invention, the throw gap y can be less than two inches, and easily less than 3 inches.

A small engagement means that the tooth tends to take a harmless chip out of a stick, without accelerating the stick, whereas a larger engagement can provide enough end grain in compression to transmit sufficient acceleration force to the stick to accelerate it.

Figure 19:
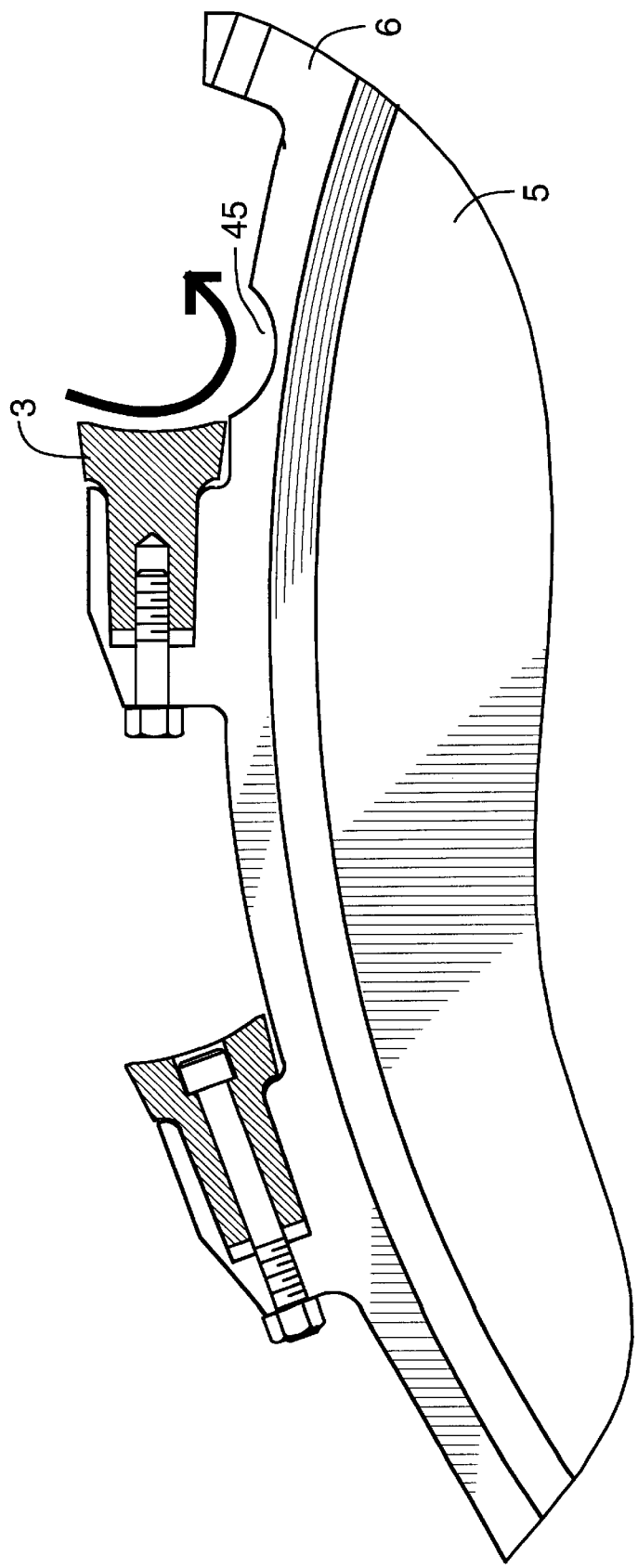
FIG. 19 (prior art) is a plan view showing prior art gullet wear.
Figure 20:
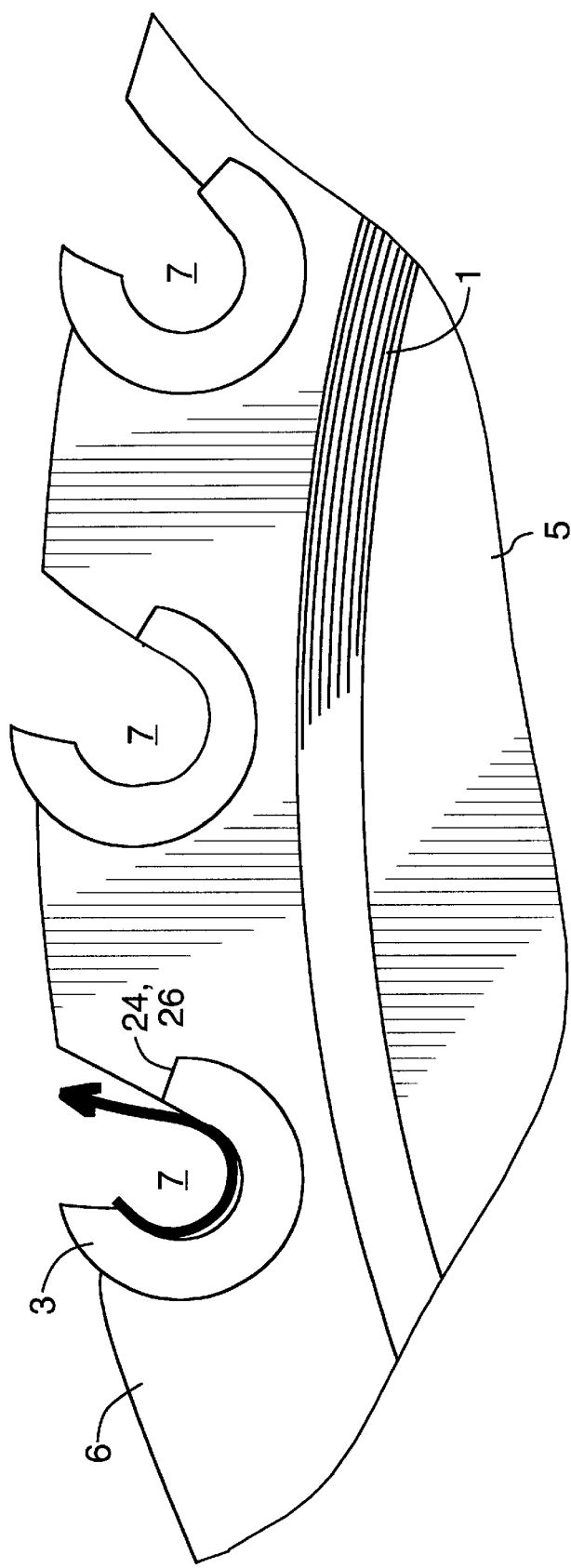
FIG. 20 is a plan view showing a blade with view showing gullet wear in the present invention.

As shown in FIG. 19 (prior art), the flow of wood chips from the cutting tips in felling saw prior art tooth and blade systems severely wears the gullet area radially inwardly from the tooth tips, resulting in a worn section 45. This gullet area is part of the blade disc or rim proper or in some designs part of a tooth holder. Thus replacing worn teeth does not remedy this wear, and after several tooth changes it sometimes becomes necessary for safety to replace the blade or holder as well. By contrast, as shown in FIG. 20, the gullet 7 in the present invention is part of the tooth itself, so that most of the wear, as shown in the worn middle tooth of FIG. 20, is on the replaceable tooth itself, although the socket adjacent the tail stop will wear slightly as well. The right-hand tooth of FIG. 20 is a replacement tooth. Note that the socket immediately adjacent its tail stop has eroded somewhat. However, further wear is partially prevented by the fact that the new tooth juts out slightly from it. The overall result, in any event, is that the disc does not receive wear to the same degree as in the prior art, and therefore can be expected to have a much longer life.

Figure 21A:
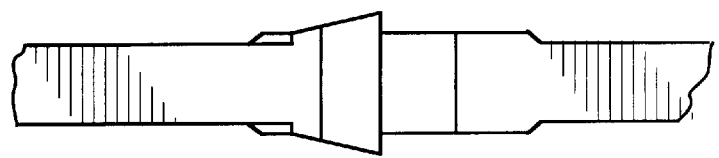
FIGS. 21A and 21B are side and plan views respectively of an alternative rim configuration with swellings or "pods" for the teeth.
Figure 21B:
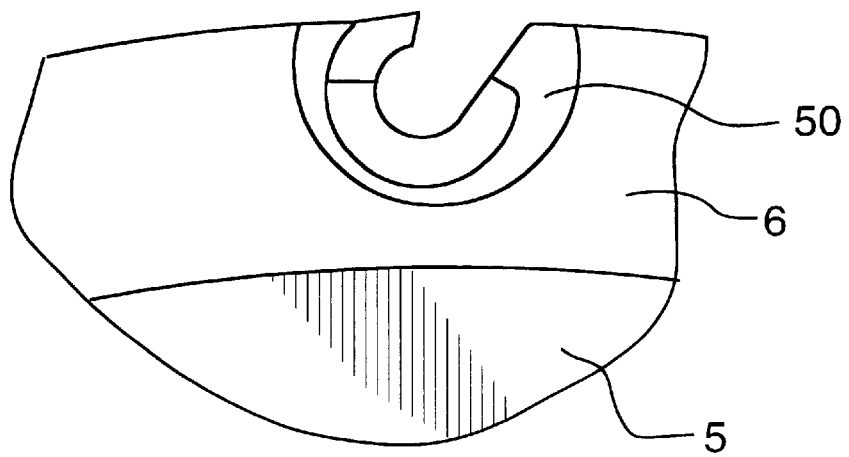

Many variations on the preferred embodiment of the invention are possible, within the scope of the invention, in addition to those already mentioned above. As just one example, it should be clear that the rim need not have a continuous thickness around the circumference of the disk, and need not have the same cross-section as in the preferred embodiment. All that is required is that the rim be thick enough in the area of the tooth to accommodate the tooth. Thus there could be a relatively thin rim 6, 1 inch for example instead of the preferred 1¼ to 2 inches, with tooth mounting swellings or "pods" 50, i.e. bulged out areas which are suitably radiused and tapered so as not to provide an exposed surface which could engage and throw a stick, as illustrated in FIGS. 21A and 21B. Such a configuration, although more expensive to manufacture, would be somewhat lighter and would allow a little extra space for air and chips to flow, thus improving self-cleaning.

Figure 22:
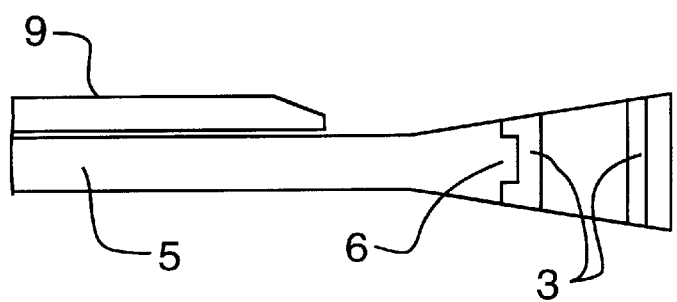
FIG. 22 is a side cross-sectional view of an alternative tapered rim and tooth.

For some uses the rim could be tapered inwardly, possibly with teeth tapering similarly, as illustrated in FIG. 22. This configuration might reduce weight and friction while retaining the advantage of a small throw gap, but air and chip flow might not be as improved. Thus throughout this specification, it should be clearly understood that the word "rim" is not intended to denote necessarily a continuous rim or a rim of constant cross-section.

What is claimed is:

1. A disc saw comprising a disc saw blade and a plurality of arcuate teeth detachably mounted in complementary-shaped arcuate sockets provided in a rim portion around the circumference of said disc saw blade, each of said teeth having a tail end and a cutting end, said cutting end having a cutting edge projecting slightly from the circumference of said disc saw blade when said tooth is installed in one of said arcuate sockets, rearward from said tail end in terms of an intended direction of rotation of said disc saw blade, each of said teeth when installed having a portion thereof butting against stop means associated with said disc saw blade to prevent rotation of said cutting edge in a direction inwardly from said circumference of said disc saw blade, said stop means thereby absorbing rotational forces transmitted from said cutting edge during cutting, said stop means comprising a transverse tail stop surface defined by an inward projection of each of said arcuate sockets, each of said teeth having a tail stop portion adjacent its tail end which butts against said tail stop surface, said disc saw having a throw entry gap at each tooth location of less than 3 inches, where said throw entry gap is defined as the distance from said cutting edge across each of said sockets to said rim portion, measured tangentially to said circumference.

2. A disc saw as recited in claim 1, having a said throw entry gap of less than 2 inches.

3. A disc saw comprising a disc saw blade and a plurality of arcuate teeth detachably mounted in complementary-shaped arcuate sockets provided in a rim portion around the circumference of said disc saw blade, each of said teeth having a tail end and a cutting end, said cutting end having a cutting edge projecting slightly from the circumference of said disc saw blade when said tooth is installed in one of said arcuate sockets, rearward from said tail end in terms of an intended direction of rotation of said disc saw blade, each of said teeth when installed having a portion thereof butting against stop means associated with said disc saw blade to prevent rotation of said cutting edge in a direction inwardly from said circumference of said disc saw blade, said stop means thereby absorbing rotational forces transmitted from said cutting edge during cutting, said stop means comprising a transverse tail stop surface defined by an inward projection of each of said arcuate sockets, each of said teeth having a tail stop portion adjacent its tail end which butts against said tail stop surface, wherein said teeth are sized to cut a kerf at least ¾ inch thick, said rim portion of said disc saw blade being at least ½ inch thick in at least areas adjacent said teeth.

4. A disc saw as recited in claim 3, having a throw entry gap at each tooth location of less than 3 inches, where said throw entry gap is defined as the distance from said cutting edge across each of said sockets to said rim portion, measured tangentially to said circumference.

5. A disc saw as recited in claim 4, further comprising keying means between each of said teeth and each of said sockets, in the plane of said rim portion, to ensure proper alignment of each of said teeth relative to the plane of said disc saw blade, wherein said teeth are detachably mounted by virtue of a tight fit within said arcuate sockets, with no use of fasteners to absorb cutting forces, and wherein said arcuate teeth and said arcuate sockets are parts of concentric circles, said concentric circles being of slightly different diameter, the diameter of the teeth being slightly larger than the diameter of the sockets, thereby producing said tight fit.

6. A disc saw as recited in claim 4, having a said throw entry gap of less than 2 inches.

7. A disc saw as recited in claim 6, further comprising keying means between each of said teeth and each of said sockets, in the plane of said rim portion, to ensure proper alignment of each of said teeth relative to the plane of said disc saw blade, wherein said teeth are detachably mounted by virtue of a tight fit within said arcuate sockets, with no use of fasteners to absorb cutting forces, and wherein said arcuate teeth and said arcuate sockets are parts of concentric circles, said concentric circles being of slightly different diameter, the diameter of the teeth being slightly larger than the diameter of the sockets, thereby producing said tight fit.

8. A disc saw as recited in claim 6, wherein said rim portion at least adjacent said teeth is thicker than a main body portion of said saw blade.

9. A disc saw as recited in claim 6, where said teeth are detachably mounted by virtue of a tight fit within said arcuate sockets, with no use of fasteners to absorb cutting forces.

10. A disc saw, as recited in claim 6, wherein said arcuate teeth and said arcuate sockets are parts of concentric circles.

11. A disc saw as recited in claim 10, wherein said concentric circles are of slightly different diameter, the diameter of the teeth being slightly larger than the diameter of the sockets, thereby producing a press fit.

12. A disc saw as recited in claim 6, further comprising an axial pin installed in each of said teeth through a clearance space within said blade, such that said pin contacts said blade when an installed tooth rotates slightly away from its installed position, said contact then preventing further rotation away from said installed position.

13. A disc saw as recited in claim 3, wherein said rim portion at least adjacent said teeth is thicker than a main body portion of said saw blade.

14. A disc saw as recited in claim 3, where said teeth are detachably mounted by virtue of a tight fit within said arcuate sockets, with no use of fasteners to absorb cutting forces.

15. A disc saw as recited in claim 3, wherein said arcuate teeth and said arcuate sockets are parts of concentric circles.

16. A disc saw as recited in claim 15, wherein said concentric circles are of slightly different diameter, the diameter of the teeth being slightly larger than the diameter of the sockets, thereby producing a press fit.

17. A disc saw as recited in claim 3, further comprising an axial pin installed in each of said teeth through a clearance space within said blade, such that said pin contacts said blade when an installed tooth rotates slightly away from its installed position, said contact then preventing further rotation away from said installed position.

18. A disc saw comprising a disc saw blade and a plurality of arcuate teeth detachably mounted in complementary-shaped arcuate sockets provided in a rim portion around the circumference of said disc saw blade, each of said teeth having a tail end and a cutting end, said cutting end having a cuffing edge projecting slightly from the circumference of said disc saw blade when said tooth is installed in one of said arcuate sockets, rearward from said tail end in terms of an intended direction of rotation of said disc saw blade, each of said teeth when installed having a portion thereof butting against stop means associated with said disc saw blade to prevent rotation of said cutting edge in a direction inwardly from said circumference of said disc saw blade, said stop means thereby absorbing rotational forces transmitted from said cutting edge during cutting, having a throw entry gap at each tooth location of less than 3 inches, where said throw entry gap is defined as the distance from said cutting edge across each of said arcuate sockets to said rim portion, measured tangentially to said circumference.

19. A disc saw as recited in claim 18, having a said throw entry gap of less than 2 inches.

20. A tooth for installation in an arcuate socket in a rim portion of a disc saw blade, said tooth comprising an arcuate body having a tail end and a cutting end, said cutting end having a cutting edge projecting slightly from the circumference of said disc saw blade when said tooth is installed in a said arcuate socket, rearward from said tail end in terms of an intended direction of rotation of said disc saw blade, each said tooth when installed having a tail stop portion adjacent its tail end butting against a tail stop surface within said socket to prevent rotation of said cutting edge in a direction inwardly from said circumference of said disc saw blade, said tail stop surface thereby absorbing rotational forces transmitted from said cutting edge during cutting, said tooth being at least ¾ inch thick so as to cut a kerf at least ¾ inch thick.

21. A tooth as recited in claim 20, wherein said tooth is at least 1 inch thick so as to cut a kerf at least 1 inch thick.

* * * * *